June 10, 1941.　　　L. KOZMA　　　2,244,785
AUTOMATIC TICKETING SYSTEM
Filed Oct. 27, 1937　　　6 Sheets-Sheet 2

INVENTOR
L. KOZMA
BY Ed Chinney
ATTORNEY

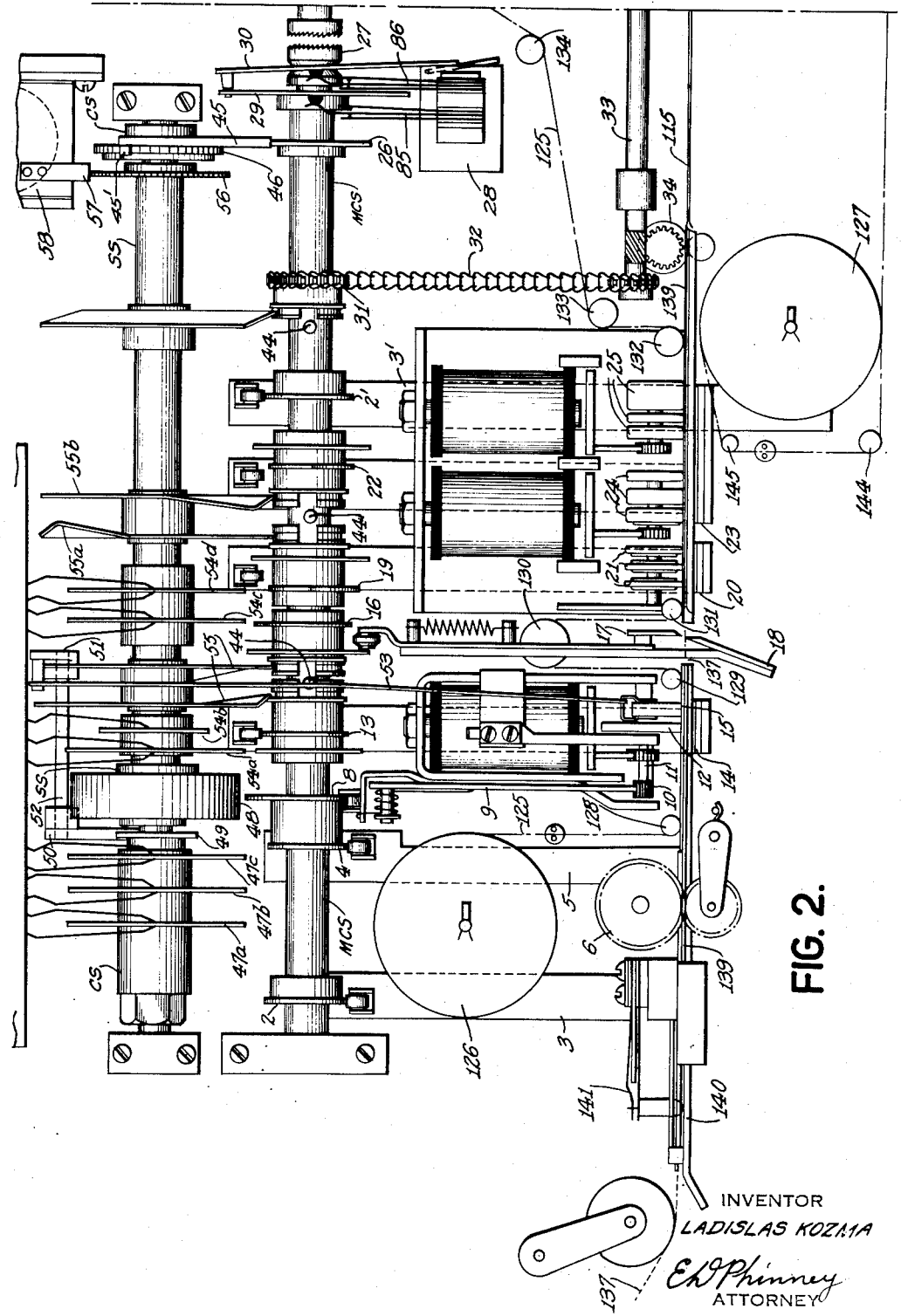

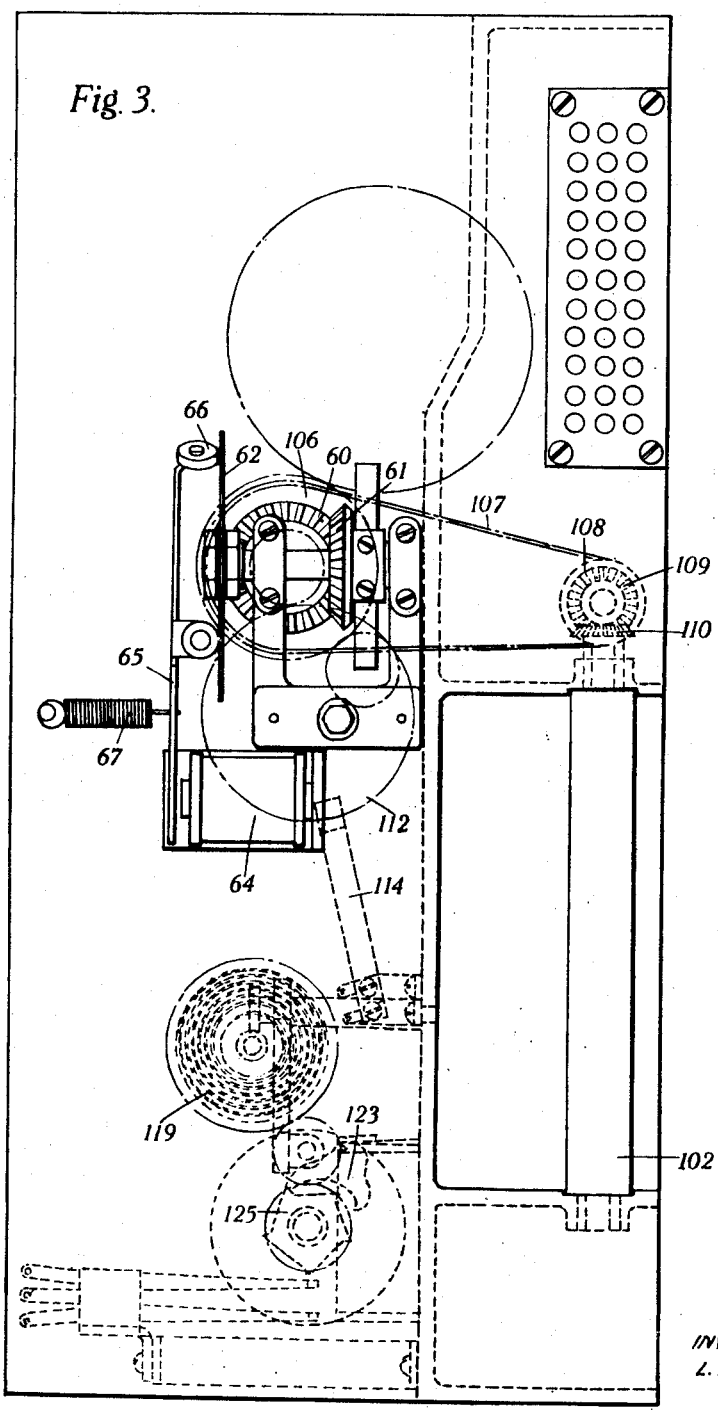

June 10, 1941.  L. KOZMA  2,244,785
AUTOMATIC TICKETING SYSTEM
Filed Oct. 27, 1937   6 Sheets-Sheet 6
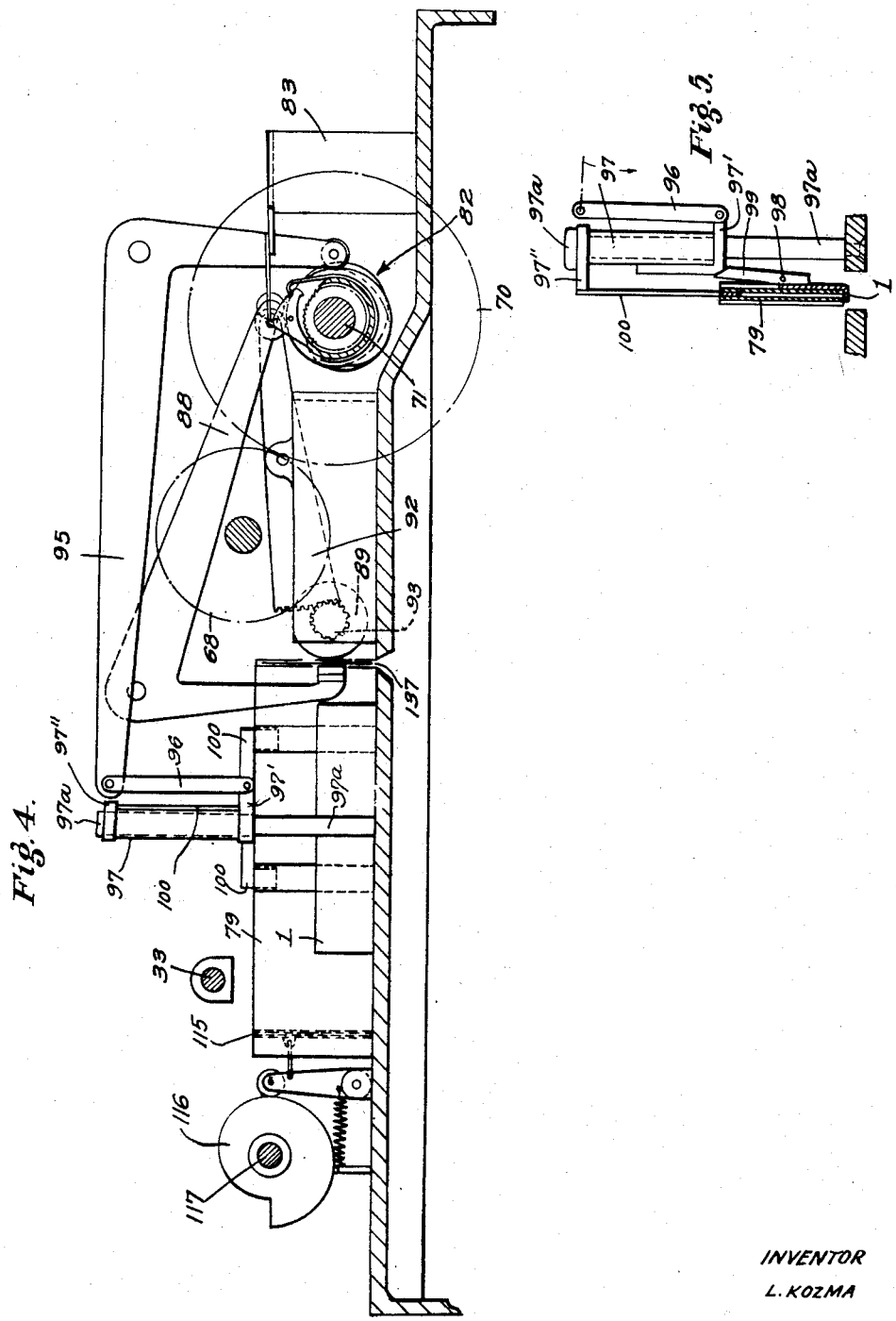
INVENTOR
L. KOZMA
BY Ed Chinney
ATTORNEY Patented June 10, 1941

2,244,785

UNITED STATES PATENT OFFICE 2,244,785

AUTOMATIC TICKETING SYSTEM

Ladislas Kozma, Antwerp, Belgium, assignor to International Standard Electric Corporation, New York, N. Y.

Application October 27, 1937, Serial No. 171,274
In Great Britain November 20, 1936

4 Claims. (Cl. 179—7.1)

This invention relates to automatic equipment for recording data relating to connections set up via communication systems for billing purposes for instance.

The object of the invention is to increase the efficiency of the equipment, whereby a considerable reduction in cost could be obtained.

Equipment previously proposed has a series of devices for recording different information, which all, except the duration recorder, are idle during conversation, or during a great part of the conversation. For the remainder of conversation the only job of the equipment is to register the duration of the conversation. If, therefore, this last function could be separated from the rest, the other portion of the equipment with the remaining functions could be liberated and made available for new calls immediately after those functions have been performed.

It is proposed, therefore, to associate a number of duration recording devices with a single main recording equipment, or a large number of duration recording devices with a small number of main recording equipments.

The main feature of the invention comprises automatic equipment for recording data relating to connections set up via communication systems, characterised by at least one mechanism for recording information such as the identity of the calling and called stations and the tariff rate, a larger number of mechanisms for recording at least the duration of connections and feeding means for directing the recording medium from a mechanism of said first type to an idle mechanism of said second type.

The invention will be understood from the following description of one embodiment shown in the accompanying drawings, in which:

Figs. 1 and 1A show schematically the various electrical control circuits for a ticket printer in accordance with the invention;

Figs. 2 and 2A taken together form a plan view of the complete machine;

Fig. 3 is a partial elevation of the complete machine;

Fig. 4 is an incomplete representation of a section along line 4—4 of Fig. 2A; and Fig. 5 illustrates a detail of one of the storage channels shown in Fig. 2A.

Figure 1:
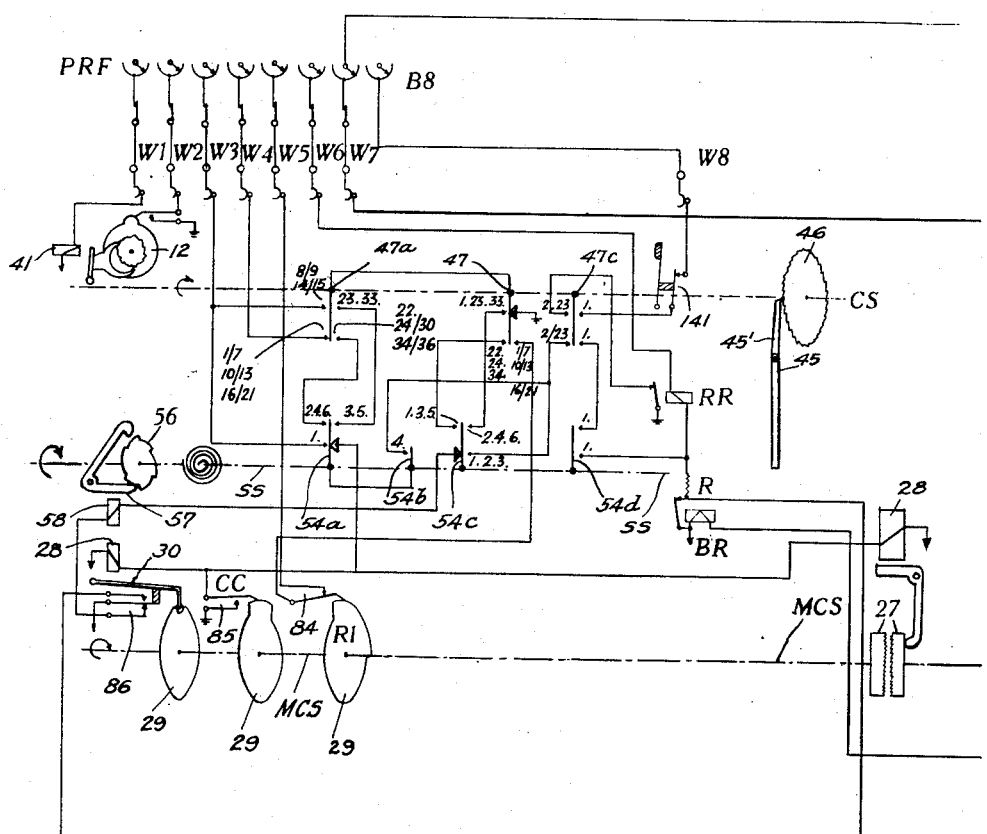
Figure 1A:
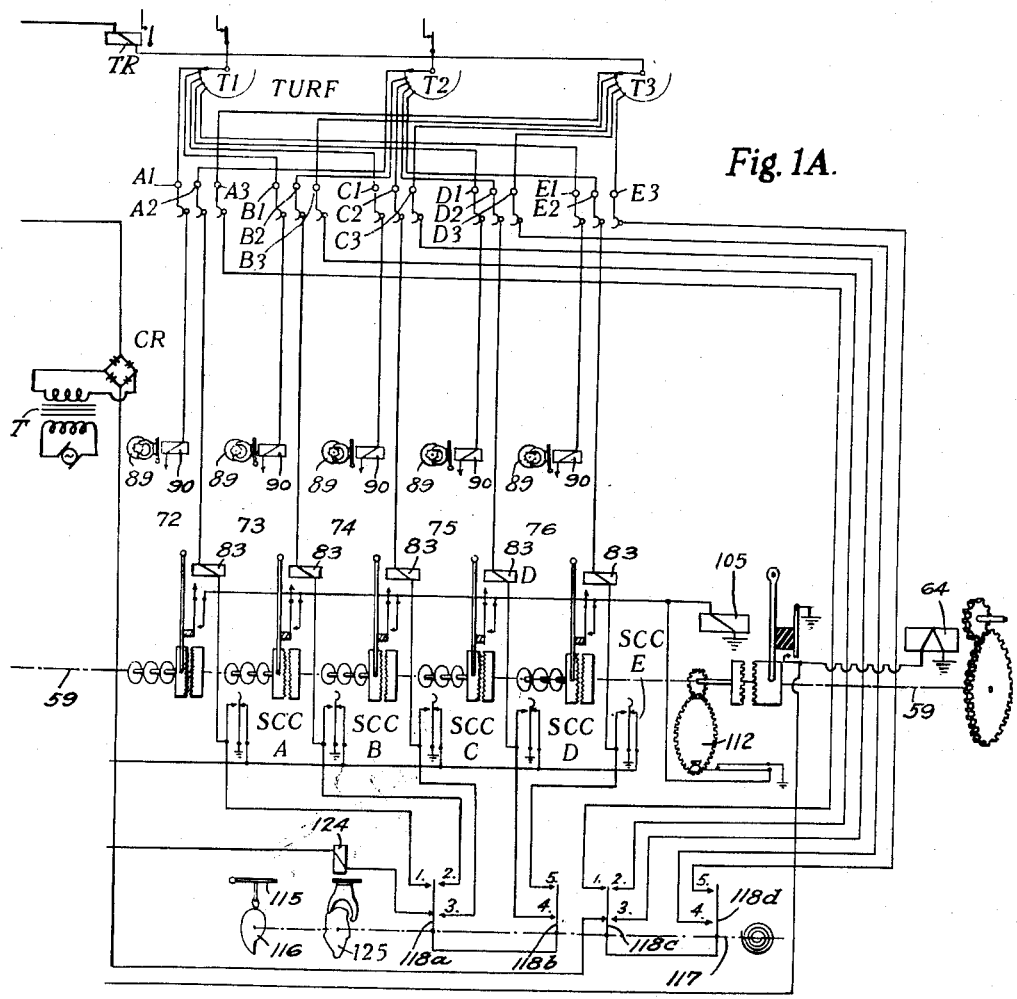
Figure 2A:
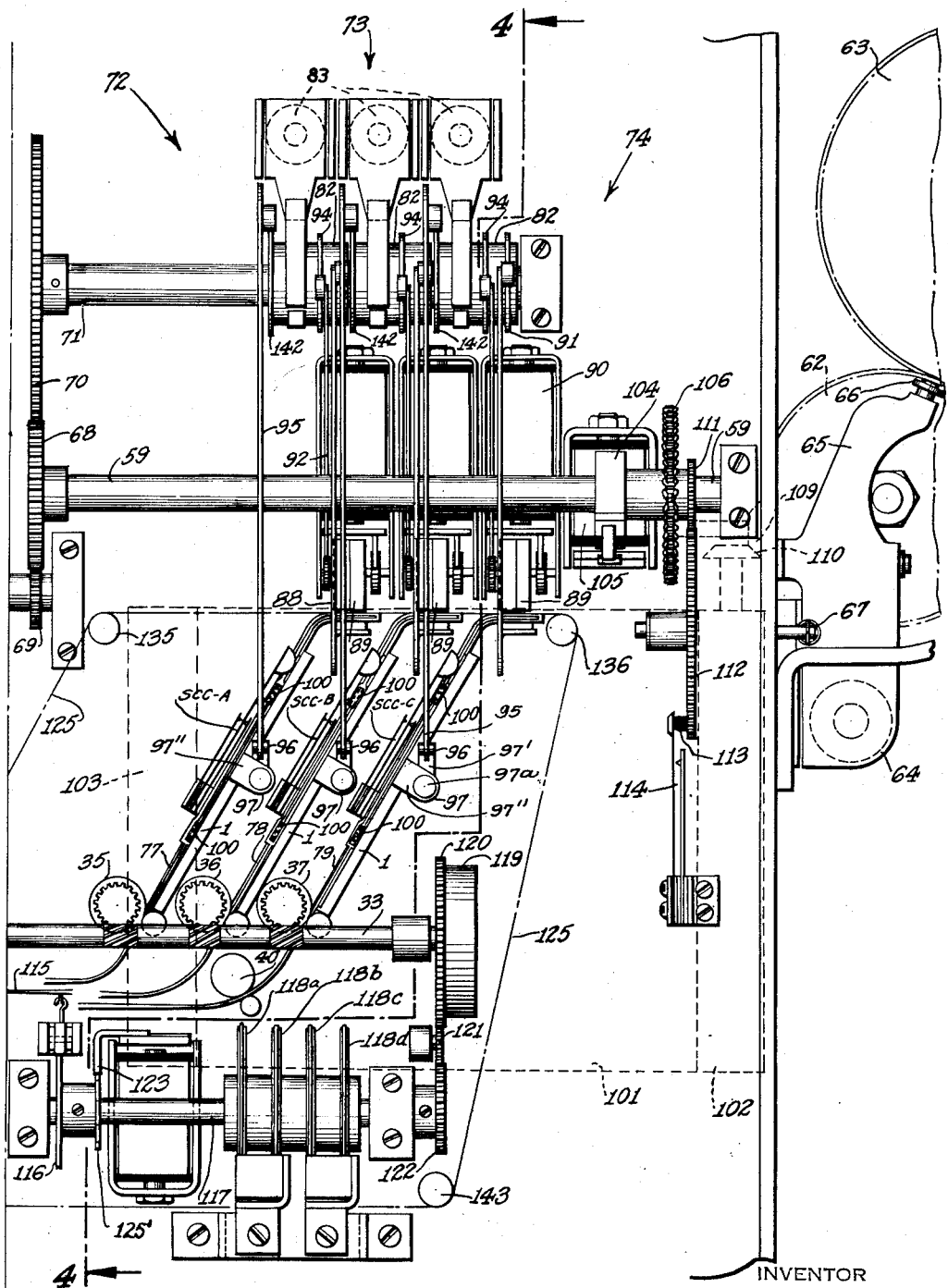

The ticket printer consists of two principal parts, namely, the printing recorder shown in plan view in Fig. 2 and schematically represented principally in Fig. 1, and the time unit printer shown in plan view in Fig. 2A and schematically represented principally in Fig. 1A.

Briefly the printing recorder shown in Fig. 2 is a mechanism similar to well known automatic ticketing machines such as described in British Patent 472,434. This recorder is adapted to go through a predetermined cycle of operation in the course of which (a) the calling subscriber's number, (b) the called subscriber's number, and (c) a third number indicative of the tariff rate to be charged, are printed in accordance with three corresponding sets of numbering pulses transmitted to the recorder from the connection over suitable control wires, and finally after these numbers have been printed further indications such as (d) date and time, and (e) serial number, are recorded after which the ticket bearing these records is cut off and ejected through a chute which terminates in the movable deflector portion 115 shown in Figs. 2 and 2A.

The time unit printer which constitutes the second principal part of the complete machine is shown schematically in Fig. 1A and in plan view in Fig. 2A, and principally comprises five storage channels 77, 78, 79, etc. (of which three are shown in Fig. 2A), and five printing-and-ejecting units generally represented in Fig. 1A and in part in Fig. 2A by 72, 73, 74, 75 and 76. In Fig. 2A only the first three storage channels and printing-and-ejecting units are shown. This time unit printer receives the tickets ejected from the printing recorder, each ticket being received into a vacant one of the storage channels under the control of a suitable distribution mechanism which maintains the deflector portion 115 (shown in Figs. 2 and 2A), through which the tickets are ejected from the ticketing recorder, aligned at all times with the mouth of a vacant storage channel. The time unit printer holds each ticket in its corresponding storage channel during the continuance of the associated connection and in response to timing impulses received over the connection the time unit printer advances a duration printing wheel in step-by-step fashion throughout the continuance of the connection. At the end of the connection the duration of the call as registered on the duration printing wheel is printed on the stored ticket and this ticket is ejected, thus freeing the storage channel again.

The complete machine is designed to be operated principally by power derived from the constantly rotating gear wheel 63 (partly shown in Fig. 2A) and for this purpose a flexible gear 62 is disposed in position to engage with rotating gear 63, but is normally flexed out of engagement with gear 63 by roller 66 on lever 65 which is acted upon by spring 67. A main starting magnet 64 is arranged to attract the lever 65 against the pull of spring 67 so as to move roller 66 out of engagement with flexible gear 62 and thus permit this flexible gear to come into engagement with rotating gear 63. The consequent rotation of gear 62 is imparted over bevel gears 61 and 60 to the main jack shaft 59 from which in turn the other rotating parts of both the printing recorder and time unit printer derive their power.

DETAILED DESCRIPTION OF PRINTING RECORDER

Referring first to the printing recorder mechanism shown practically completely in Fig. 2 and schematically represented in Fig. 1, this printing recorder comprises a main cam shaft MCS which directly furnishes the operating power for such operations as printing, severing, ejecting, advancing, etc., a counting shaft CS having 36 positions through which it is advanced in step-by-step fashion in response to 36 rotations of the main cam shaft, a hollow shifting shaft SS rotatably mounted outside of the counting shaft CS and spring coupled thereto but restrained by a six position escape mechanism 56—57 so as to rotate, not in 36 small steps like the counting shaft CS, but in 6 big steps.

The main cam shaft MCS carries a number of cams 26, 2, 22, 19, 16, 13, 8, 4 and 2', as well as a chain driving gear 31, a clutch 27 and a centering disc 29 (properly shown in Fig. 2 but represented as two separate discs for clarity in Fig. 1). This centering disc also serves to operate contact sets 84 (not shown in Fig. 2 but only in Fig. 1) and 85. The cooperating centering or latching member 30 not only serves to stop disc 29 in the proper position but when actuated further serves to actuate contact set 86 and simultaneously to engage detent clutch 27. When clutch 27 is engaged the main cam shaft MCS is driven from gear 69 which in turn is driven from a gear 68 on the main jack shaft 59 previously mentioned. The detent clutch 27 and the associated latch 30, as well as the contact set 86 are simultaneously controlled by clutch magnet 28 which in Fig. 1 is for convenience represented as two separate magnets connected in parallel.

Certain of these cams and the chain driving gear above mentioned on main cam shaft MCS are rotatably mounted on the main cam shaft and adapted to be engaged for rotation thereby only when displaced endwise so as to engage with driving pins 44. Cams 2, 2' and 4, however, are permanently fixed to the shaft MCS and serve respectively to actuate members 3, 3' and 5 which by means of pawls (not shown) advance the ribbon reels 126, 127 and the paper feed roller 6. Cam 26 is also permanently fixed to the shaft MCS and serves to actuate member 45 which in turn by means of a pawl 45' advances 36-tooth ratchet wheel 46, thus rotating counting shaft CS in step-by-step fashion. Cam 8 is likewise permanently fixed to the shaft MCS and serves to drive the resetting lever 9 which by means of a toothed rack portion engaging with pinion 10 rotates shaft 11 of the digit wheel 12 to reset the latter.

The remaining cams 22, 19, 16 and 13 as well as the chain drive gear 31 are loosely mounted on the shaft MCS and adapted to be driven thereby only when displaced endwise so as to engage with key pins 44. Such endwise motion of these members 22, 19, 13 and 31 is controlled by five warped discs 55a, 55b, 55c, 55d, 55e mounted on the hollow sequence shaft SS and shaped to cause the engagement of the cams 22, 19, 16, 13 and the chain driving gear 31 in certain positions of SS by engaging with grooves in the hubs of the cams as shown. The discs are shaped to shift the cams and gear in accordance with the following table:

*SS position 1*

In position 1 of shaft SS, digit printing cam 13 engages pin 44 so that in this condition the rotation of main cam shaft MCS will rotate cam 13, which will then actuate printing pad 14 to press the paper 137 against type wheel 12 as well as against the prefix type member 15.

*SS position 2*

In position 2 of shaft SS, cam 22 engages the main cam shaft MCS so as to actuate printing pad 23 for pressing paper 137 against type wheels 24 of the date printer and type wheels 25 of the hour printer.

*SS position 3*

In position 3 of shaft SS, cam 19 engages with the main cam shaft MCS so as to actuate printing pad 20 for pressing paper 137 against type wheels 21 of the serial number printer.

*SS position 4*

In position 4 of shaft SS, no cams are engaged with the main cam shaft MCS excepting permanently fixed cams 2, 2, 4 and 8 which respectively advance the paper and ribbon and actuate resetting arm 9. This resetting arm performs no useful function at this time, but does not interfere with desired operations.

*SS position 5*

In position 5 of shaft SS, cam 16 engages with the main shaft MCS so as to actuate cutting member 17 and thus sever paper 137 by cooperation with fixed blade 18.

*SS position 6*

In position 6 chain driving gear 31 engages with main cam shaft MCS and thus by means of chain 32 drives shaft 33 which in turn drives ejecting roller 34 in the printing recorder as well as intake feed rollers 35, 36, 37 and 40 in the time unit printer.

From the above description it will be seen that the main cam shaft MCS supplies the power for most of the recording, advancing, severing and ejecting operations and that the position of sequence shaft SS serves to govern which of the various possible operations is performed by rotation of shaft MCS. The rotation of shaft SS itself is controlled by escapement disc 56 which is released a step at a time by escapement pawl 57 actuated by armature of magnet 58. The power for rotating shaft SS is derived from a spiral spring contained in housing 48 and connected between shaft SS and the counting shaft CS in this invention. In addition to the escapement disc 56 and the warped discs 55, already mentioned, shaft SS carries a plurality of contact cams 54a, 54b, 54c and 54d of the well known sequence-switch type, which serve to control the sequence of operations of the machine as best shown in the schematic circuit diagram of Figs. 1 and 1A.

Counting shaft CS which is advanced one step for each rotation of MCS by means of cam 26, as previously mentioned, also carries a plurality of contact cams 47a, 47b, 47c, of the sequence-switch type. Counting shaft CS also carries in addition to its driving ratchet wheel 46 a single cam 49 which actuates arm 50 to rotate shaft 52 which in turn, by means of arm 51, pulls wire 53 to swing prefix type member 15 out of operating position subsequent to the printing of the first digit of the calling subscriber's number.

In addition to the above described three shafts MCS, SS and CS, and the members operated thereby, and in addition to the clutch magnet 28 and the escapement magnet 58 as above described, the printing recorder also comprises three further magnets 41, 42 and 43, which respectively advance the numbering type wheel 12 and the date and hour sets of type wheels 24 and 25. All these magnets and wheels are clearly shown in Fig. 2 but only magnet 41 and wheel 12 are shown in Fig. 1, the others being omitted for simplification. For some purposes it may be desired to provide an off normal contact on type wheel 12, as shown schematically in Fig. 1. This feature is not essential, however, and is not illustrated in Fig. 2.

The printing recorder mechanism above described and illustrated in Figs. 1 and 2 will be seen to be essentially similar to a conventional telephone ticket printer, except that certain parts have been simplified by the omission of the usual means for recording the duration of a connection.

DETAILED DESCRIPTION OF TIME UNIT PRINTER

The time unit printer shown in Fig. 2A and schematically represented principally in Fig. 1A, consists essentially of five storage channels (of which only the first three, 77, 78 and 79 are shown in Fig. 2A) and five cooperating printing-and-ejecting units (of which likewise only the first three generally represented by 72, 73 and 74 are shown in Fig. 2A).

Each of the storage channels 77, 78, etc., consists essentially of an S shaped paper chute with an open bottom, and a hinged member 1 partially closing the bottom of the chute, as best seen in Fig. 5. Intake feed rolls 35, 36, 37 and 40 which are driven by shaft 33 at the time of ejectment of a ticket from the printing recorder extend into the channels 77, 78 and 79, as shown, so as to pick up the ticket ejected from the printing recorder by means of a roller 34 and feed it into storage position in the appropriate storage channel. Each storage channel also is provided with a change-over contact SCC—A, SCC—B, etc., which is positioned to be operated by a ticket when such a ticket is fed into the channel.

Cooperating with the five storage channels 77, 78, 79, etc., are the printing-and-ejecting units 72, 73, 74, etc. Each of these printing-and-ejecting units consists principally of a set of printing wheels 89, a magnet 90 for advancing these printing wheels in step-by-step fashion, a cam and clutch mechanism 82, a magnet 83 for actuating such cam and clutch mechanism and printing, resetting and ejecting means controlled by the cams of the mechanism 82. The several cam and clutch mechanisms 82 are all carried on a common shaft 71 which is geared to common jack shaft 59 through gears 70 and 68, whose diameters are chosen to give the proper speed for the printing-and-ejecting mechanisms 72, 73, etc.

Each cam and clutch mechanism 82, as can be more clearly seen in Fig. 4, comprises a clutch-and-latch device of the type employed in start-stop teleprinters, each such clutch-and-latch device being adapted in response to a brief unlatching operation of the magnet 83 to make exactly one revolution and then come to rest. Cams 91, 94 and 142 are fixed to such mechanism so as to rotate when the clutch is unlatched for rotation by magnet 83. The three cams respectively operate levers 88, 92 and 95 (clearly shown in both Fig. 2A and Fig. 4). Lever 88 serves to press the ticket against printing wheels 89; immediately thereafter reset lever 92, which is in the form of a toothed sector geared with pinion 93, operates to restore wheels 89 to normal while simultaneously lever 95, acting through link 96 imparts a downward motion to bottom arm 97' which is fixed to the lower end of slider 97. Thus slider 97 slides downward along spindle 97a and top arm 97'' which is fixed to the upper end of this slider acts to push ejector plunger 100 down into the storage channel to eject the complete ticket. As more clearly seen in Fig. 5, at the commencement of the downward movement of ejector 100 a sloped cam surface on sliding member 97 engages a cooperating cam surface of arm 99 affixed to the movable member 1 which closes the bottom of the storage channel. Therefore, at the commencement of the downward stroke of the ejector 100 the movable bottom 1 of the channel swings open around the pivot 98, thus permitting the complete ticket to be forced out of the bottom of the channel by ejector plunger 100. In Fig. 5 which illustrates the ejector mechanism in detail the link 96 is schematically shown on the opposite side of slider member 97 from the ejector plunger for simplicity of illustration. Actually, however, as more correctly shown in Fig. 2A, this link 96 and the ejector plunger 100 are angularly disposed around the slider 97.

An endless belt 101 is stretched between rollers 102 and 103 below the bottom of all the storage channels to receive the ejected tickets. The shaft of roller 102 is driven through bevel gears 109 and 110 from a small chain gear 108 located behind a chain gear 106 as more clearly shown in Fig. 3. This chain gear 106 in turn is driven from the main jack shaft 59 through a start-stop type clutch 104 controlled by magnet 105. Since it is desired that the movement of belt 101 should be long enough to insure that a ticket ejected from the first storage channel 77 shall be carried completely out of the machine to the outlet chute (not shown) gears 111 and 112 are provided for closing a suitable circuit which may be used to maintain clutch magnet 105 energized during several turns of chain gear 106. Accordingly the gear 111 is fixed to chain gear 106 and is arranged to drive the larger gear 112 with sufficient reduction so that one revolution of this larger gear 112 will correspond to several revolutions of the chain gear 106, and consequently to a sufficient advance of belt 101. A stud 113 on gear 112 serves to open a pair of contacts 114 when the gear 112 is in normal position but permits these contacts to close whenever the gear is off normal.

OTHER PARTS OF COMPLETE TICKET PRINTER

The deflector portion 115 of the chute through which the tickets are ejected from the printer recorder mechanism (which is shown partly in Fig. 2 with the printing recorder and partly in Fig. 2A with the time unit printer) is positioned by means of cam 116 are more clearly shown in Fig. 4, for the purpose of at all times maintaining this deflector portion of the chute opposite the mouth of a vacant storage channel. Cam 116 is carried by shaft 117 whose rotation is controlled by escapement wheel 125 and escapement pawl 123 which is actuated by magnet 124, as best seen in Fig. 2A. Shaft 117 also carries contact cams 118a, 118b, 118c and 118d of the sequence switch type. The rotary power for turning shaft 117 is derived from a spring contained in housing 119 through gears 120, 121 and 122. The spring in housing 119 is kept continuously wound up by shaft 33, the details of the winding arrangement being omitted from the illustration for simplicity.

The ink ribbon 125 which is shown as a dot-dash line to minimize confusion in Figs. 2 and 2A, extends from reel 126 over guide rollers 128, 129, 130, 131, 132, 133, 134, 135, 136, 143, 144 and 145 to reel 127. Thus this ribbon passes successively between the paper strip and the wheels 21, 24 and 25 of the serial digit and time unit printers, and then between the ends of the stored tickets and the wheels 89 of the time unit recorders. As previously mentioned, bars 3, 3 serve to actuate both reels 126 and 127 by pawls (not shown). A mechanism of any known type (not shown) is provided to reverse the movement of the ink ribbon.

The paper strip 137 which is shown in dotted lines may be supplied from a large drum (not shown). This paper passes into the channel 138 whose mouth portion 140 is adapted to be opened for insertion of the paper. Spring contacts 141 are positioned to be operated by the paper strip when the mouth portion 140 is closed.

Figs. 1 and 1A together form a schematic circuit diagram of the electrical connections of the complete ticket printer together with certain closely associated relays and switches required for controlling the operation of the machine and for connecting it with a conversation channel. For simplification of the schematic illustration the hour and date magnets have been omitted from Figs. 1 and 1A, and the centering and contact controlling disc 29 has been represented as three separate cams 29. Also shaft 71 has been omitted from the schematic showings of Figs. 1 and 1A and the several cam and clutch mechanisms 72, 73, etc., have been shown as operated directly by the main jack shaft 59. Furthermore, as previously mentioned, the single clutch magnet 28, which serves not only to engage clutch 27 but simultaneously to disengage latch 30 from centering disc 29 and likewise to actuate contacts 86, has been schematically represented in Fig. 1 as two separate magnets 28 connected in parallel.

For associating the complete ticket printer of the present invention with the printing register and toll trunk of an established connection two groups of finders are required. These finders may be of any type used in the telephone art. The first finder PRF which is associated with the printing register of the connection makes the connection to the printing recorder and a second finder TURF associated with the trunk engaged in the connection selects one of the ticket storing channels of the time unit recorder which is associated with the printing recorder already connected to the trunk. An identifying circuit is required for marking the storage channel to be seized after the printing recorder has been connected to the trunk.

The complete ticketing machine is jacked in the bay by means of a plug and jack which is schematically represented in Figs. 1 and 1A as having 23 points W1—W8, A1—A3, B1—B3, C1—C3, D1—D3, E1—E3. The printing recorder is connected to the terminals of the finder through wires W1 to W7. The five storing channels are connected in multiple to the terminals of the ticket storing channel finders. The ticket printers may be connected in multiple to a plurality of successive groups of terminals in the banks of finders PRF and the finder TURF has five possible positions corresponding to each position of PRF.

Wires W1 to W5 are used for the impulses from and to the trunk equipment, wire 6 is used for the clearing signal, wire 7 is in a test circuit for marking the storing channel to be taken.

An eighth brush B8 is connected to a test circuit via W8, 141, 47c and 54d in positions 1, resistance R, back contact of relay BR, battery, to stop the finder when it has reached an idle ticket printer.

It is to be noted that, for the purpose of avoiding troubles during the hunting operation, the circuits between the printing recorder and the finder, as well as between the trunk and the storing channel finder are closed only when the finders have achieved their hunting operation and are stopped.

In the ticket storing channel circuits, wires A1, B1, etc., and A2, B2, etc., carry the impulses from the trunk equipment. Wires A3, B3, etc., are in the test circuit.

A ticket printer may be taken for recording a connection only when at least one of its storing channels is free.

Each storing channel is provided with a change-over contact SCC operated by the ticket. Relay BR is energized when at least one channel is free. When all SCC contacts are operated, BR releases.

When the ticket printer is free, battery is connected through contact of BR, resistance R, 54d (1.1.), 47c (1.1.), 141, wire W8 to the corresponding brush of the finder.

When the finder test brush arrives on the terminal of a printer, a test relay operates and stops the finder.

Battery is sent by the automatic equipment on wire W6 to operate release relay RR, the contact of which will be used at the end of the printing operations or in case of premature release.

A printing recorder having been connected to a trunk, a marking circuit is established to designate the ticket storing channel to be taken by the trunk.

Wires A3, B3, C3, D3, E3 are connected to their respective test terminals in the time unit recorder finder. At the other end, through the contacts of cams 118c and 118d they are connected in sequence to a source of potential independent from battery and ground to allow to obtain a completely individual test circuit. This source of potential is a small rectifier CR fed by a small transformer T and a source of alternating current. The other side of the rectifier is connected to a wire W7 which extends to a terminal of the printing recorder finder. The corresponding brush is joined to the test brush of the time unit recorder finder through a test relay TR.

Let us assume that storing channel 78 is free and the first to be taken. This means that the deflector 115 is in front of the channel 78, contact 118b is closed and springs SCC—B are in the position shown on the drawings.

A trunk having been connected to a printing recorder, the test circuit of the time unit recorder is then as follows:

From rectifier CR, wire W7, brush of PRF, relay TR, brush T3, B3, 118b to rectifier.

When brush T3 arrives on the terminal corresponding to B3, test relay TR operates and stops the finder.

The trunk is now connected to a printing recorder and to the first free time unit recorder of same.

The ticket is printed in a similar manner as in the normal ticket printer but the operations are slightly simplified due to the fact that no perforations are made, all tickets are of the same length, and the date and hour are recorded automatically just after the subscribers' numbers are printed.

The operations are as follows:

As soon as the ticket printer has seized a trunk, relay RR operates.

Numbering impulses received over wire 1 operate digit printer 41 and the digits are printed when an impulse is sent over wire 3; magnet 28 is energized through 54a. It clutches MCS with 59 and at the same time closes the circuit of 64 which clutches 59 with the shaft of the bay. The circuit of 28 remains closed by contacts 85 until MCS has made a complete revolution.

During the rotation, ground is separated from wire W5 at contacts 84.

Counting shaft CS is advanced one step by means of 46.

In position 2 of CS, ground remains connected to wire 4 via 47a, 47b, and is connected again to wire 3 via 47b when MCS is stopped in normal position.

Further trains of impulses produce the same effect as the first one and the same operations are repeated up to position 7 of CS.

When 28 reaches position 8 the circuit of CM is closed via 47a in positions 8 and 9 in turn for printing two dashes.

Digit groups are also printed in positions 10 to 13 and 16 to 21, dashes being printed in positions 14, 15. When the last digit is printed, CS arrives to position 22.

In this position ground is removed from wires 4 and 5 and following circuit is closed: from battery, through back contact of contact set 86, magnet 58, 54c (1), 47b (22) to ground. Magnet 58 is energized and SS arrives to position 2 in which the digit printing cam is declutched and the date and hour printing cam is clutched.

Circuit of 28 is closed through 54a (2) and 47a (22). Magnets 28 and 64 are energised and MCS rotates for printing date and hour.

CS arrives to position 23 in which 58 is again energised through 54c (2) and 47b (23).

SS rotates and arrives to position 3 where serial number printing cam is clutched. Circuit of 28 is again closed through 54a (3), 47a (23). MCS rotates and the serial number is printed.

CS arrives to position 24 in which 58 is again energised through 54c (3), 47b (24).

SS passes to position 4 in which no cam is clutched.

Magnet 28 is energised through 54a (4), 47a (24/30). MCS rotates and the ticket makes several steps to get its normal length.

CS arrives to position 31, 58 is energised through 54c (4), 47b (31). SS rotates to position 5 and paper severing cam is clutched.

MCM is now energised through 54a (5), 47a (32).

MCS rotates and the ticket is severed.

CS arrives in position 34.

Magnet 58 is energised through 54c (5), 47b (34); SS rotates to position 6 in which paper severing cam is declutched and ticket driving gear is clutched.

Magnet 28 is energised through 54a (6), 47a (34/36).

MCS rotates three times until CS comes back to position 1. During this rotation, the ticket is seized by rollers which drive it through the deflector to the free storing channel 78.

When CS is back to position 1, 58 is energised through 54c (6), 47b (1).

SS rotates and comes back to position 1.

The battery is again connected to the starting circuit if relay BR is still energised, i. e. if there is one free storing channel.

It has been assumed that channel 78 (corresponding to printing and ejecting mechanism 73) was free. When the ticket arrives in this channel 78, it operates the associated change-over contact springs SCC—B and the following circuit is closed: from battery through contact of BR, Magnet 124, 118a (2) SCC—B to ground. Magnet 124 is energised and shaft 33 rotates under the action of its spiral spring. If channel 79 is free, 124 ceases to be energised when shaft 33 arrives in position 3 and the rotation is stopped. Cam 116 keeps the deflector 115 in front of channel 79. If the channel 79 is not free, magnet 124 remains energised through 118a (3) SU—C and shaft 33 continue to rotate. The same operation is repeated until shaft 33 arrives to a position where the deflector 115 is in front of a free channel. If all channels are occupied by tickets, relay BR is no more energised and shaft 33 does not rotate. The ticket printer does not close the starting circuit of its trunk finder, and remains busy.

The ticket stored in the channel 78 is in front of a printing-and-ejecting unit 73 which registers the time units on printing wheels 89; impulses are sent from the automatic equipment over wire B1 to operate the magnet 90 and thus advance these wheels 89.

At the end of the connection, an impulse is sent over wire B2 to clutch magnet 83 of printing-and-ejecting unit 73. This magnet 83 releases cam-and-clutch mechanism 82 of unit 73 for one revolution, thereby (a) causing member 88 to press the ticket against the type wheels 89 of the printing-and-ejecting unit 73, (b) restoring the wheels 89 to their starting position by means of toothed sector 92 and (c) ejecting the ticket from the chute by means of plunger 100.

The armature of clutch magnet 83 closes a contact (not shown in Fig. 2a) which energises the discharge clutch magnet 105.

This latter closes the circuit of 64, unlatches stop-start clutch 104 thus causing rotation of chain drive gear 106 for driving endless belt 101 which carries the ticket to a chute (not shown). Contacts 114 of gear 112 which is geared to the preceding gear 111 keeps the circuit of 105 closed until 112 has made a complete turn. In this manner the ejecting gear 106 makes several turns which are necessary for carrying the tickets, but the cam-and-clutch mechanism 82 operated by magnet 83 remains in operation for but one turn because the circuit is broken at the contact of SCC.B as soon as the ticket is ejected.

What is claimed is:

1. Automatic equipment for recording data relating to connections set up via communication systems which have a number of trunks; comprising a first mechanism for recording preliminary information of the type which can be ascertained before the termination of a connection, a first group of duration recorders for recording timing information dependent upon the time of disconnection of a connection, said first group of recorders being permanently mechanically associated with said first mechanism and being provided with means for transferring a recording medium from said first mechanism to any of the recorders of said first group; a second mechanism similar to said first mechanism, a second group of recorders similar to said first group, said second group of recorders being permanently mechanically associated with said second mechanism and being provided with means for transferring a recording medium from said second mechanism to any of the recorders of said second group; means for operatively associating either one of said mechanisms with a connection relative to which data is to be recorded, and means for associating with said same connection one of the recorders of that group which is associated with said one of said mechanisms, whereby a single one of said mechanisms may record on separate media the preliminary information relating to a number of copending connections whereas the timing information relating to such connections may be recorded on the appropriate ones of said same media by the mechanically associated group of recorders.

2. Equipment according to claim 1, wherein said mechanisms and said recorders each comprise guide channels, further comprising operating means for causing relative movement of the outgoing end of the guide channel of one of said mechanisms relative to the incoming ends of the guide channels of the recorders associated therewith, whereby the recording medium may be directed from the mechanism to any preselected one of the associated recorders.

3. Equipment according to claim 1, wherein each of said recorders comprises a printing wheel, means for selectively positioning said printing wheel in response to time pulses received from said connection, and means responsive to the termination of said connection for actuating said printing wheel to directly record the duration of said connection.

4. Equipment according to claim 1, comprising a single ink ribbon and means for guiding said ribbon in operative relationship with one of said mechanisms and with the recorders of the associated group.

LADISLAS KOZMA.